Patented May 7, 1940

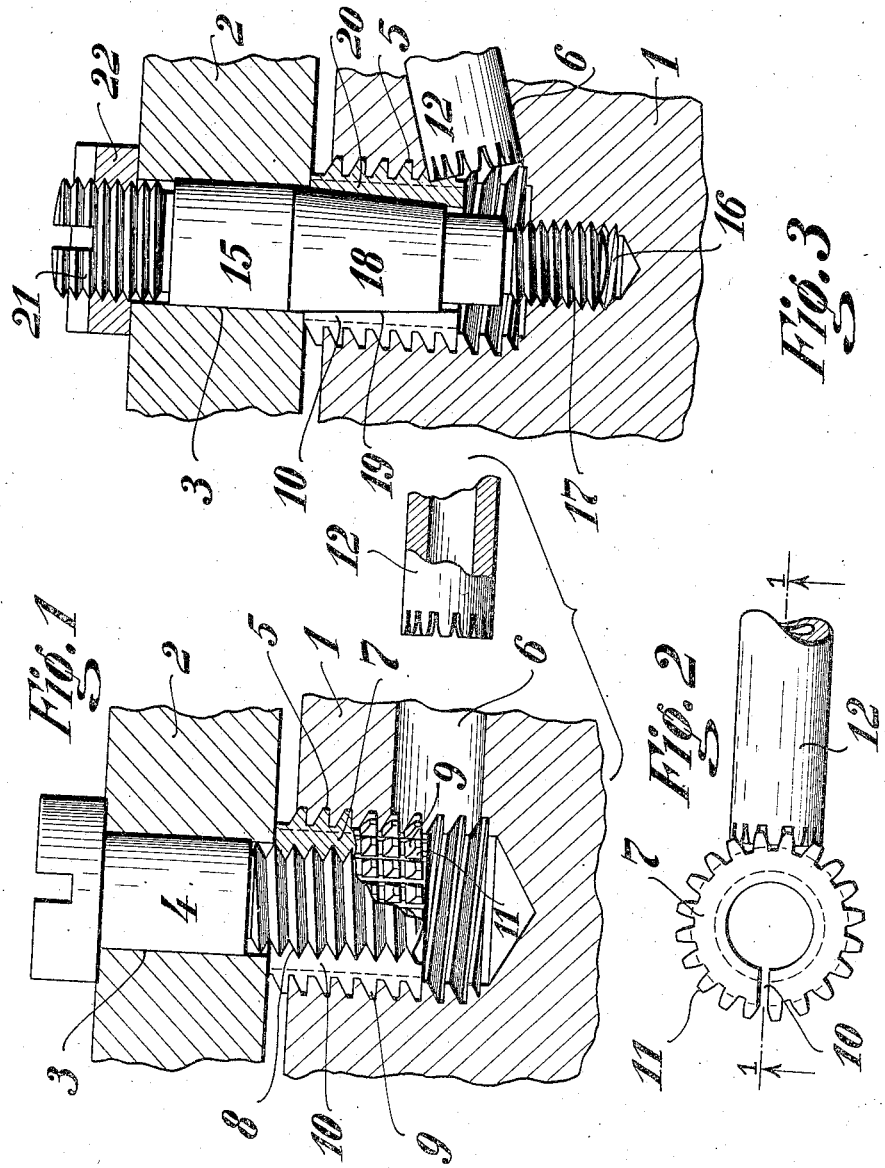

2,199,802

UNITED STATES PATENT OFFICE 2,199,802

ADJUSTING DEVICE FOR ADJACENT PARTS OF MACHINERY

Ernst Leitz, Jr., and Rudolf Noack, Wetzlar, Germany, assignors to Ernst Leitz, G. m. b. H., Wetzlar, Germany Application November 21, 1939, Serial No. 305,484
In Germany October 7, 1938

6 Claims. (Cl. 85—1)

This invention relates to improvements in devices which are used to secure two adjacent parts of a machine or structural unit or the like together in adjusted relationship by means of a screw or bolt which is screwed into an adjustable sleeve which in turn is screwed into one of said parts.

Prior devices of this type include certain disadvantages with respect to accessibility and convenience in adjustment. Other prior devices have the adjusting parts project too far from the one part which is to be secured to the other part.

The object of this invention is to provide a generally improved device of the type referred to. Specifically it is an object to provide such an adjusting device including a sleeve which is provided with screwthreads so that it can be screwed into one of the parts to be adjusted and which is also provided with a gearing whereby the sleeve may be adjusted by means of a key which is used at a right angle to the axis of the sleeve. The latter is preferably expansible and may have an inner screwthread or be formed with an inner cone for the reception of the securing bolt or screw. It is also a feature of the invention that the outer screwthread on the sleeve in cross-section has the form of a sawtooth to prevent movement after it has been adjusted.

Accordingly this invention is embodied in an adjusting device constructed as hereinafter set forth and as illustrated in the accompanying drawing in which:

Fig. 1 is a view partly in section and partly in elevation of an adjusting device embodying the invention with the key separate from the sleeve, the section is taken on the line 1—1 of Fig. 2.

Fig. 2 is an end view of the sleeve with the key in engagement therewith.

Fig. 3 is a view similar to Fig. 1 but shows a modification.

The two parts 1 and 2 in the drawing represents two parts or pieces of a machine, a structure or the like which are to be secured together in adjusted relationship by means of an adjusting device embodying the invention. The part 2 is provided with a simple straight bore 3 through which passes the screw or bolt which secures the two parts together. In Fig. 1 the screw is marked 4. The other part 1 is provided with a threaded bore 5 to be alined with the bore 3 and is also bored at 6 at a right angle to the bore 5 as shown. Into the threaded bore 5 there is screwed a sleeve 7 which has an interior screw thread 8 and an exterior screw thread 9. Preferably the exterior screwthread 9 is sawtooth formed. The sleeve 7 is provided with a slit at 10. In addition and as one of the features of the invention the sleeve is provided with a gearing as at 11. That is to say, the exterior screwthread 9 is formed in the usual manner on the outside of the sleeve and the thread is also cut to form gearing 11 as seen in Fig. 2. The teeth of this gearing are parallel to the axis of the sleeve. A toothed key 12 is adapted to be inserted through the bore 6 to engage the gearing 11 of the sleeve 7.

In use the sleeve is first screwed into the part 1. Then the screw 4 is inserted through the bore 3 in part 2 and screwed into the sleeve 7. Then the key 12 is inserted through the bore 6 into engagement with the gearing 11 on the sleeve. By turning the key, the sleeve will be screwed further in or out until the two parts 1 and 2 have been spaced or adjusted the desired distance apart. Then the screw 4 is screwed home in the interior screwthread 8 whereby the sleeve is expanded and pressed firmly against the surrounding wall of the threaded bore 5. Due to the sawtooth formation of the exterior screwthread the horizontal surfaces thereof are forced against the corresponding horizontal surfaces of the threads in the bore 5 and whereby axial movement by the operation of the screw 4 is avoided. Such axial movement might occur were ordinary screwthreads provided.

Fig. 3 illustrates a modification in which a screw 15 is used to secure the two parts 1 and 2 together. Such parts in Fig. 3 which are similar to the already described parts bear the same reference numbers. In Fig. 3 the part 1 is additionally bored and screwthreaded as at 16 to receive the threaded end 17 of the screw 15. The latter is provided with a coneshaped portion 18 adapted to engage an interiorly formed cone 19 in the sleeve 20. The latter is otherwise similar to the sleeve 7 in Fig. 1. The operation is similar to that described for Fig. 1. The screw 15 is inserted through the bore 3 in the part 2 and passes through the sleeve 20 into engagement with the threaded bore 16 and the two parts are screwed together. Thereafter the key 12 is used as before to adjust the sleeve 20. When the screw 15 is screwed home its cone portion 18 will expand the sleeve 20 by engagement with the interior cone in the sleeve. The screw 15 may be threaded as at 21 to receive a lock nut 22. The device herein disclosed includes the advantage of means for the exact adjustment of the two parts 1 and 2 in the form of an outer gearing on the sleeve engageable by the separate key 12. It is therefore possible to observe the spacing of the two parts from the side as distinguished from spacing means which are operable axially of the device. Another advantage is that there are no parts projecting above the upper surface of the part 2 except the head of the securing screw. When the latter is screwed home within the sleeve in Fig. 1 or into the threads 16 in Fig. 3 the two parts are firmly held together in exact spaced relation and the holding sleeve firmly pressed into engagement with the surrounding wall of the part 1.

It is also an object of the invention that the key for handling the adjusting means may be inserted through the key bore at any angle to the axis of the sleeve as shown in Fig. 3. This arrangement allows the sleeve 7 or 20 reaching the ground of the threaded bore 5 without preventing engagement between the toothed key 12 and the outer gearing on the sleeve 7 or 20.

We claim:

1. A device for securing two parts in adjusted juxtaposed relation comprising a sleeve, screwed into one of the parts and having its outer end formed to engage the inner face of the other part, a screw extending through the other part and having threaded engagement with the interior of the sleeve to secure the two parts together, and means for moving the sleeve and screw axially to adjust the position of the sleeve, including gearing on the sleeve and a key engageable with the gearing to move the sleeve and thereby adjust the distance between the confronting faces of the two parts.

2. A device for securing two parts together in juxtaposed relation, comprising a screw extending through one of the parts, a sleeve-like part threaded into engagement with the other part, one of the two last-named parts having threads to engage the threads of the screw, said sleeve-like part having its outer end engaged with the inner face of the first-named part, and means for moving the sleeve-like part and screw axially to adjust the position of the sleeve-like part whereby to adjust the space between the confronting faces of the two parts to be secured together, said means including gearing on the sleeve and a key engaging the gearing to move the sleeve to adjust the space between two parts to be secured together.

3. A device for securing two parts in accordance with claim 2, wherein the key has means on its end engaging the gearing of the sleeve whereby to rotate the latter.

4. A device for securing two parts in accordance with claim 2, wherein the gearing is formed on the exterior screw threads of the sleeve.

5. A device for securing two parts in accordance with claim 2, wherein the gearing is formed on the threads; and wherein the key has means on its inner end engaging the gearing.

6. A device for securing two parts, in accordance with claim 2, wherein the sleeve-like part is axially split and has a tapering bore; wherein the screw has a similar tapered portion engaging the tapered bore of the screw to expand the sleeve-like part, and wherein the threads which engage the threads of the screw, are formed in the said other of the parts to be connected.

ERNST LEITZ, Jr.
R. NOACK.